United States Patent [11] 3,613,026

[72] Inventors Michael L. Skolnick
Monroe, Conn.;
United Aircraft Corporation, East Hartford, Conn.
[21] Appl. No. 21,263
[22] Filed Mar. 20, 1970
[45] Patented Oct. 12, 1971

[54] PLASMA TUBE IMPEDANCE VARIATION FREQUENCY STABILIZED GAS LASER
4 Claims, 1 Drawing Fig.
[52] U.S. Cl. ................................................. 331/94.5
[51] Int. Cl. ................................................. H01s 3/00
[50] Field of Search ..................................... 331/94.5

[56] References Cited
OTHER REFERENCES
Rowley, Dr. W. R. C., et al. " Wave-Length Stabilization of an Optical Maser." Nature, Nov. 23, 1963. pp. 745– 747.

*Primary Examiner*—Ronald L. Wibert
*Assistant Examiner*—T. Major
*Attorney*—Melvin Pearson Williams ABSTRACT: A gas laser employing a synchronous detector and modulated cavity length in a well-known hill-climbing servo frequency stabilization apparatus is improved by utilizing a voltage indicative of plasma tube impedance variations as the feedback input to the synchronous detector.

The invention herein described was made in the course of or under a contract or subcontract thereunder with The Department of the Air Force.

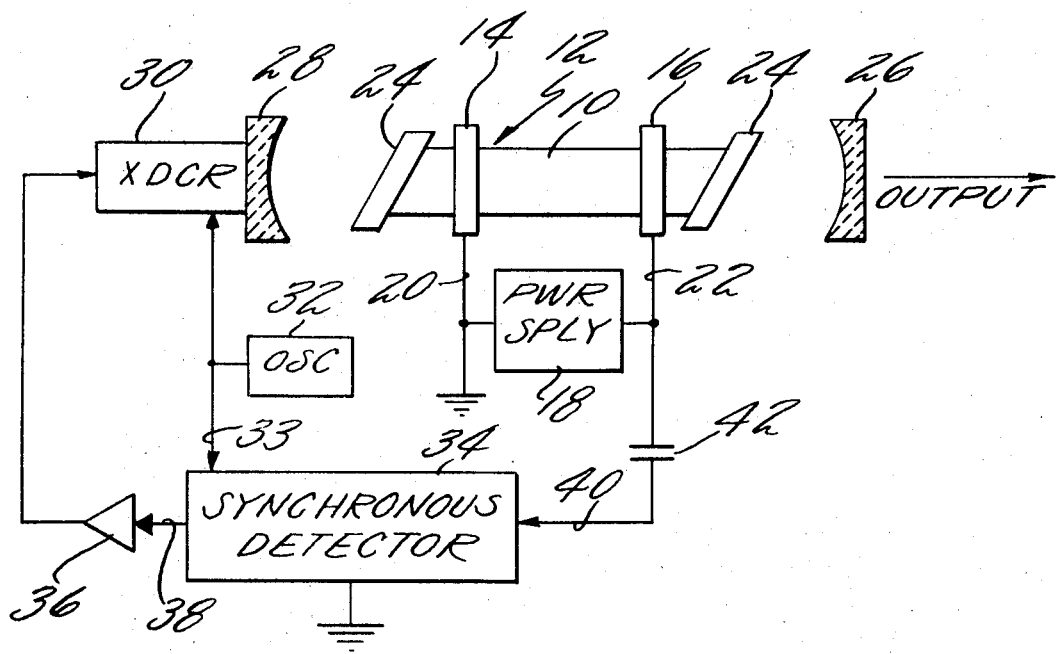
INVENTOR
MICHAEL L. SKOLNICK
BY ATTORNEY

PLASMA TUBE IMPEDANCE VARIATION FREQUENCY STABILIZED GAS LASER

BACKGROUND OF THE INVENTION

1. Field of Invention

This invention relates to gas lasers, and more particularly to frequency stabilization of the optical cavity thereof.

2. Description of the Prior Art

Frequency stabilized lasers find a variety of applications including optical radar, oscillator-amplifier systems, and many laser optical experiments. The output power of a laser is generally a symmetrical resonance function of frequency referred to as the gain characteristic. The center frequency depends on the gas species used and the details of the shape and width of the gain characteristic depend on many parameters of the laser, such as: gas species, pressure, gas temperature, etc.

As is known, optical transitions of a typical molecular gas laser consist of a multitude of lines because of rotational level splitting. However, by incorporating optical dispersion, such as by means of gratings, etalons, or prisms etc., within the laser cavity, the laser can be made to oscillate on only one transition. Thus, since the laser may be regulated to provide a single transition, and thus optical output at but a single frequency, it has become advantageous to control the frequency of the single transition very carefully, thus to avoid wide variation in the output frequency as a result of minor variations in the length of the optical cavity.

In the prior art, a common arrangement for a control system to carefully regulate the length of a laser optical cavity, and therefore to regulate the exact frequency of the laser output, employs a hill-climbing servo which dithers the position of one of the mirrors of the cavity. This is accomplished by mounting the mirror on a piezoelectric crystal or other transducer, the transducer having an oscillatory voltage applied thereto for the purpose of providing a known minor cyclic variation in cavity length, and the effect of the cavity length oscillations are sensed and compared with the oscillatory driving signal in a synchronous detector. The synchronous detector then provides a discriminant error signal having a magnitude proportional to the difference between the actual cavity length and desired cavity length, and having a polarity indicative of whether the length has become too large or too small. Thus the servosystem can drive the mirror position in a direction to tend to maintain the average cavity length constant. In systems of this type, the detector typically comprises a beam splitter which takes a small portion of the output beam and conveys it to an optical detector, the detector providing an oscillatory voltage which is equivalent to the effect on the output beam of the dither provided by the mirror. However, the beam splitter requires a rather sophisticated optical system which is sensitive to shock and temperature variations and is thus not well suited to airborne and other severe environmental applications. In addition, optical detectors required for such a system are costly, require intricate power supplies, cryogenic cooling, and other adjunctive apparatus. Similar other methods of frequency stabilization of lasers are known. However all prior methods of stabilizing the frequency of a gas laser employ the detection of the resulting perturbation of the laser output beam: thus all such systems require the use of the fragile and expensive optical detecting system described hereinbefore.

SUMMARY OF THE INVENTION

The object of the present invention is to provide improved, simplified stabilization for the optical cavity of a gas laser.

According to the present invention, the feedback input to the synchronous detector of a closed loop laser cavity length adjusting system is derived from variations in impedance in an electric discharge plasma of a gas laser. In accordance still further with the present invention, the voltage current-stabilized electric discharge plasma in a gas laser utilized to provide an input to a closed loop laser cavity length stabilization system.

The present invention avoids any necessity to monitor the optical output of a gas laser in order to control the cavity length thereof. The invention is relatively inexpensive to employ, and can be implemented in highly stable, compact and durable fashion.

The foregoing and other objects, features and advantages of the present invention will become apparent in the light of the following detailed description of a preferred embodiment thereof, as illustrated in the accompanying drawing.

BRIEF DESCRIPTION OF THE DRAWING

The sole FIGURE herein is a simplified schematic diagram of an electric discharge gas laser employing one embodiment of the present invention.

DESCRIPTION OF THE PREFERRED EMBODIMENT

Referring now to the FIGURE, one preferred embodiment of the invention comprises an electric discharge laser employing a laser gain medium 10 such as any one of a number of well-known gas mixtures. These include carbon dioxide, with or without nitrogen, helium or other adjunctive gases, or neon and helium, for instance. Other gaseous laser gain mediums are known. In the present embodiment, it is presumed that a suitable mixture of carbon dioxide, nitrogen and helium is employed as a laser gain medium.

The laser gain medium 10 is confined in a chamber 12 across which is applied a DC voltage between a pair of electrodes 14, 16, which comprise an anode and a cathode as is well known in the art. The DC voltage is provided by a suitably ballasted power supply 18 connected thereto by conductors 20, 22. The voltage between the electrodes 14, 16 promotes an abnormal glow plasma within which the lasing gas becomes excited to upper laser level energy states, as is known. As illustrated herein, the chamber 12 may be closed off at either end by suitable windows, such as Brewster windows 24 comprised of a suitable material (for the wavelength of laser oscillations involved) mounted at the Brewster angle. The optical cavity also includes a pair of mirrors 26, 28, the mirror 26 comprising an output mirror and thereby either having a hole therein for output coupling or having the characteristic of partial transmissivity for output coupling, all as is known in the art.

The mirror 28 is suitably mounted, such as by an epoxy bond, to a piezoelectric transducer 30 of a type which is well known in the art. Such a transducer has the characteristic that its length changes in response to a voltage suitably applied to surfaces of the transducer, in dependence upon the configuration chosen, as is known in the art. One voltage applied to the transducer 30 is a dithering voltage derived at the output of an oscillator 32, which also provides a signal at a reference input 33 to a synchronous detector 34. The other, driving voltage applied to the transducer 30 is a discriminant DC error signal which may be suitably amplified and filtered, such as by a DC amplifier means 36. This signal is derived from the output 38 of the synchronous detector 34.

In operation, the output of the oscillator 32 applied to the transducer 30 causes an axial dithering motion of the mirror 28 which in turn alters the frequency of electromagnetic radiation within the optical cavity formed between the mirrors 26, 28. As this frequency varies from the transition center frequency of the lasing medium, a lower optical output results. In prior art systems, the optical output is monitored by means of an optical detector which provides a signal at a signal input 40 of the synchronous detector 34. The synchronous detector 34 compares the phase of the reference signal applied by the oscillator 32 with the phase at the signal input 40, and senses the magnitude of the input 40, together providing the discriminant error signal: the magnitude is an indication of the degree of deviation of the cavity length from the desired cavity length, and the polarity is an indication of the sense of variation (shorter or longer) of the cavity length in comparison with the desired cavity length. Thus, the output 38 of the synchronous detector 34 provides a DC signal to be applied to the transducer 30 which will cause the transducer to move the mirror in the right direction toward the desired cavity length, thereby to achieve the desired output frequency. The actual output of the laser, in such a system, is slightly modulated due to the dithering of the mirror 28 by the transducer 30 in response to the oscillator 32. However, the average cavity frequency is closely maintained at very near the desired cavity frequency, and the deviation in the laser output beam is very small.

The present invention relates particularly to deriving a signal at the input 40 of the synchronous detector 34 without any need to detect the power or frequency of the output of the laser.

In accordance with the present invention, the input to the synchronous detector is a voltage proportional to the impedance of the plasma within the chamber 12. Specifically, a capacitor 42 attached to the lead 22 couples an AC voltage from the electrode 16 to the signal input 40 of the synchronous detector 34. By suitable arrangement, such as grounding the power supply lead 20 and an appropriate common potential in the synchronous detector 34, the AC voltage which appears between the electrodes 14, 16 is applied as an input to the synchronous detector. As is well known in the art, whenever the optical power extracted from the electric discharge plasma of a gas laser is varied, the impedance of the plasma varies. When the current in the plasma is maintained constant, such as by a suitable constant current power supply, then the potential or voltage across the plasma varies. By dithering the mirror 28, the frequency of the cavity is similarly varied in an oscillatory fashion; this alters the resonant frequency of the cavity and thereby the power extracted from the laser. Thus, the impedance of the plasma between the electrodes 14, 16 varies cyclically as a function of the dithering of the mirror 28. Since the current is constant, the voltage between the electrodes 14, 16 varies accordingly; this voltage is picked off by the capacitor 42 and used as an input to the synchronous detector 34. Thus, instead of monitoring the optical output of the laser, by the simple expedient monitoring the voltage between the electrodes, while maintaining the current substantially constant, the present invention provides a feedback input to a closed loop cavity length control system.

Although the capacitor 42 is shown connected directly to the lead 22 in the embodiment herein, it should be understood that the signal input 40 to the synchronous detector 34 may be capacitively coupled to various suitable points within a power supply 18, in dependence upon the design of the power supply. Thus, it may be advantageous to obtain a signal from a low-voltage error amplifier within the power supply, and so forth. In such a case, a constant current supply may not be needed to provide sensing of plasma impedance variations in accordance with the invention. Similarly, although the invention has been shown and described with respect to but one preferred embodiment thereof, it should be understood by those skilled in the art that the foregoing and various other changes and omissions in the form and detail thereof may be made therein, without departing from the spirit and the scope of the invention.

Having thus described a typical embodiment of my invention, that which I claim as new and desire to secure by Letters Patent of the United States is:

1. An electric discharge gas laser comprising:
   an optical cavity including a pair of mirrors and a gaseous laser gain medium disposed between said mirrors;
   means for establishing an electric discharge plasma within said laser gain medium;
   an electromechanical transducer attached to one of said mirrors;
   a synchronous detector having a reference input and a signal input and producing an output signal the magnitude of which is a function of the magnitude of a signal applied to said signal input, the polarity of which is a function of the phase between signals applied to said reference and signal inputs;
   means applying an oscillatory voltage to said electromechanical transducer and to said reference input of said synchronous detector;
   means applying the output of said synchronous detector to said electromechanical transducer, whereby the average position of said mirror is determined by the output of said synchronous detector, the instantaneous position of said mirror being determined as well by said oscillatory voltage;
   and feedback means for developing a voltage proportional to the impedance of said electric discharge plasma and applying said voltage to said signal input of said synchronous detector, whereby the average length of said optical cavity is controlled as a function of the impedance of said electric discharge plasma.

2. The electric discharge gas laser according to claim 1 wherein said feedback means comprises means responsive to the voltage across said plasma.

3. The gas laser according to claim 1 wherein said plasma establishing means comprises a pair of electrodes and a constant current high-voltage DC power supply connected between said electrodes, and wherein said feedback means comprises means for coupling the voltage across said electrodes to said signal input of said synchronous detector.

4. In the method of stabilizing the frequency of an electric discharge gas laser having a pair of mirrors forming an optical cavity, the steps of:
   dithering the position of one of the mirrors, and thereby the length of the optical cavity of the laser;
   providing a feedback signal proportional to the impedance of the electric discharge plasma of the laser;
   providing a driving signal the magnitude of which is proportional to the magnitude of said feedback signal and the sense of which is a function of the phase difference between the dithering of the mirror and the feedback signal; and
   adjusting the position of the mirror in response to said driving signal.